United States Patent [19]

Ikeda et al.

[11] Patent Number: 5,795,680
[45] Date of Patent: Aug. 18, 1998

[54] NON-AQUEOUS ELECTROLYTE TYPE SECONDARY BATTERY

[75] Inventors: Katsuji Ikeda; Kazuya Hiratsuka; Takeshi Morimoto, all of Tokyo; Shinji Matsumoto, Fujisawa, all of Japan

[73] Assignees: Asahi Glass Company Ltd., Tokyo; Elna Company Ltd., Fujisawa, both of Japan

[21] Appl. No.: 758,371

[22] Filed: Nov. 29, 1996

[30] Foreign Application Priority Data

Nov. 30, 1995 [JP] Japan .................. 7-336132

[51] Int. Cl.$^6$ .................. H01M 4/70; H01M 4/80
[52] U.S. Cl. .................. 429/245; 429/235; 429/218
[58] Field of Search .................. 429/235, 245, 429/218, 224; 423/447.6

[56] References Cited

U.S. PATENT DOCUMENTS

| | | | |
|---|---|---|---|
| 5,344,724 | 9/1994 | Ozaki et al. | 429/94 |
| 5,514,488 | 5/1996 | Hake et al. | 429/218 |
| 5,554,460 | 9/1996 | Wu et al. | 429/218 |
| 5,567,539 | 10/1996 | Takahashi et al. | 429/57 |
| 5,589,299 | 12/1996 | Yamada et al. | 429/218 |
| 5,591,547 | 1/1997 | Yoneda et al. | 429/218 |
| 5,651,399 | 7/1997 | Holland et al. | 141/32 |

FOREIGN PATENT DOCUMENTS

| | | |
|---|---|---|
| 0 563 988 | 10/1993 | European Pat. Off. |
| 0 627 776 | 12/1994 | European Pat. Off. |
| 0 657 953 | 6/1995 | European Pat. Off. |

OTHER PUBLICATIONS

Takeuchi et al., Chemical Abstracts Accessio No. 125: 119493, "Secondary nonaqueous electrolyte lithium batteries with improved anodes", JP 08138654 A2, May 31, 1996.

Patent Abstracts of Japan, vol. 017, No. 115, (E–1330), Mar. 10, 1993, JP 04 296448, Oct. 20, 1992.

Patent Abstracts of Japan, vol. 018, No. 540, (E–1616), Oct. 14, 1994, JP 06 196169, Jul. 15, 1994.

Patent Abstracts of Japan, vol. 016, No. 344, (E–1239), Jul. 24, 1992, JP 04 104459, Ap. 6, 1992.

Patent Abstracts of Japan, vol. 018, No. 139, (E–1519), Mar. 8, 1994, JP 05 325947, Dec. 10, 1993.

Patent Abstracts of Japan, vol. 95, No. 7, Aug. 31, 1995, JP 07 111150, Apr. 25, 1995.

Patent Abstracts of Japan, vol. 018, No. 540,(E–1616), Oct. 14, 1994, JP 06 196170, Jul. 15, 1994.

Patent Abstracts of Japan, vol. 016, No. 385, (E–1249), Aug. 17, 1992, JP 04 123758, Apr. 23, 1992.

Patent Abstracts of Japan, vol. 010, No. 244, (E–430), Aug. 22, 1986, JP 61 074268, Apr. 16, 1986.

*Primary Examiner*—Kathryn L. Gorgos
*Assistant Examiner*—Carol Chaney
*Attorney, Agent, or Firm*—Oblon, Spivak, McClelland, Maier & Neustadt, P.C.

[57] ABSTRACT

A non-aqueous electrolyte type secondary battery comprises a negative electrode capable of occluding and releasing lithium, a positive electrode capable of occluding and releasing lithium, a non-aqueous electrolyte which contains a lithium salt, and a container for accommodating the negative electrode, the positive electrode, and the electrolyte. The negative electrode is formed by pressing a foam metal or a fibrous sintered metal which contains nickel as a principal component thereof and which is filled with a mixture of a binder and a carbon material capable of occluding and releasing lithium. The negative electrode has a thickness of not less than 0.1 mm and a porosity of 20 to 50%.

9 Claims, 1 Drawing Sheet

NON-AQUEOUS ELECTROLYTE TYPE SECONDARY BATTERY

BACKGROUND OF THE INVENTION

1. Field of the Invention

The present invention relates to a non-aqueous electrolyte type lithium-ion secondary battery (hereinafter referred to as non-aqueous secondary battery), and particularly to a non-aqueous secondary battery having excellent endurance with respect to charge-discharge cycles, a small internal resistance, and a capability of being charged/discharged at a large current.

2. Description of the Related Arts

Batteries using an alkali metal as an active material are of particular interest as high-performance batteries having high energy density. Among such batteries, a lithium battery has already been used as a primary battery in a power supply of small-sized electronic equipment, because of its particularly high energy density and excellent reliability such as a long storage life. Recently, with a portable electronic equipment being popularized, there has been a sharp increase in demand for a lithium secondary battery that can be repeatedly charged for use.

Examples of material for the negative electrode of a lithium secondary battery include a lithium metal, a lithium alloy, and a carbonaceous material which is formed by the occlusion of lithium by a carbon material capable of occluding and releasing lithium. In a non-aqueous secondary battery which employs a negative electrode made of a lithium metal, a high energy density is provided. However, since a solvent in an electrolyte is reduced by active lithium which has precipitated during repeated dissolution and precipitation of lithium metal during charge-discharge cycles, lithium usable for charge/discharge is lost and there is a resultant fall in the charge-discharge efficiency of the negative electrode as well as the risk of internal short circuit due to the growth of dendrite of lithium.

The positive electrode of a secondary battery is formed as a positive electrode sheet, which is formed by the steps of mixing a solvent with a mixture comprising a positive electrode material, an electrically conductive material, and a binder to thereby prepare slurry; applying the resulting slurry onto the surface of a metallic foil that serves as a current-collecting body so as to form an electrode layer having a thickness of 50 to 100 µm; and drying the resulting electrode layer to thereby obtain the positive electrode sheet. The negative electrode of a secondary battery is formed as a negative electrode sheet, which is formed by the steps of mixing a solvent with a mixture of a negative electrode material and a binder to thereby prepare slurry; applying the resulting slurry onto the surface of a metallic foil that serves as a current-collecting body so as to form an electrode layer having a thickness of 50 to 100 µm; and drying the resulting electrode layer to thereby obtain the negative electrode sheet.

Subsequently, a sheet-shaped positive electrode and a sheet-shaped negative electrode, both having predetermined dimensions, are cut out from the positive electrode sheet and the negative electrode sheet, both prepared as described above. The thus-formed positive and negative electrodes and a separator film interposed therebetween are wound in layers to thereby form an element. Alternatively, a plurality of the thus-formed positive and negative electrodes are arranged in alternating layers while separator films are interposed therebetween, to thereby form an element. This element is placed in a container and impregnated with an electrolyte, to thereby form a battery.

In a coin-shaped non-aqueous secondary battery, there is employed a positive electrode which is prepared by forming into a disk a mixture comprising a positive electrode material, an electrically conductive material, and a binder, or by blanking out a circular piece from a sheet formed of the mixture. A negative electrode is prepared by pressure-forming into a disk a mixture of a negative electrode material and a binder, or by blanking out a circular piece from a sheet formed of the mixture. A separator made of nonwoven fabric is interposed between these positive and negative electrodes to make an element, which is then placed in a coin-shaped container and impregnated with a non-aqueous electrolyte, to thereby form a coin-shaped battery.

In a non-aqueous secondary battery, the thickness of an electrode is normally 0.5 to 5 mm. However, when the electrode has such a thickness, the following problem occurs. When a planar current-collecting body such as a metallic foil is disposed on one side of the electrode to thereby form a battery, the distance between the electrode and the current-collecting body becomes relatively large, resulting in a larger electric resistance in the direction of thickness of the electrode; i.e. a larger internal resistance as well as a longer diffusion distance of lithium ions. As a result, the utilization rate of an electrode material decreases significantly, and the energy density and capacity of the battery decrease accordingly.

Since the positive electrode material and the negative electrode material expand and contract repeatedly due to repeated charge-discharge cycles, the contact between particles of an electrode material may be cut off within an electrode with a resultant increase in an internal resistance, or particles of an electrode material may drop out of an electrode with a resultant partial failure to utilize the electrode material. As a result, the capacity of the battery decreases accordingly, and the internal resistance of the battery increases accordingly.

SUMMARY OF THE INVENTION

An object of the present invention is to solve the above-mentioned problems, and to provide a non-aqueous secondary battery having a high energy density and a relatively small internal resistance and in which repeated charge-discharge cycles do not cause particles of an electrode material to drop out of an electrode, to thereby prevent a reduction in battery capacity as well as an increase in the internal resistance.

A non-aqueous secondary battery of the present invention includes a negative electrode capable of occluding and releasing lithium (ion), a positive electrode capable of occluding and releasing lithium (ion), a non-aqueous electrolyte which contains a lithium salt, and a container for accommodating them. The negative electrode is formed by pressing a foam metal or a fibrous sintered metal which contains nickel as a principal component thereof and which is filled with a mixture of a binder and a carbon material capable of occluding and releasing lithium. The negative electrode has a thickness of not less than 0.1 mm and a porosity of 20 to 50%.

Examples of the carbon material capable of occluding and releasing lithium include artificial graphite, natural graphite, earthy graphite, expanded graphite, scaly graphite, heat-treated products of such graphites, and carbon materials obtained by thermally decomposing organic substances under various conditions. Powder of a carbon material preferably has a grain size (diameter) of 1 to 50 µm. This is because a grain size of less than 1 µm yields bulky powder with a resultant inconvenience in handling, and a grain size of over 50 µm tends to reduce a battery capacity.

Among the above-described carbon materials, a mesophase spherical carbon or a mesophase carbon short-fiber is preferably used. When mesophase spherical carbon is used, the spherical shape allows high-density filling, resulting in a large battery capacity per unit volume. Preferably, the mesophase spherical carbon has a grain size of not more than 50 µm so that it yields a large battery capacity. When mesophase carbon short-fiber is used, an electrolyte is efficiently fed to an electrode material through gaps between short fibers, resulting in an excellent charge/discharge characteristic at a large current. Preferably, the mesophase carbon short-fiber has a length of not more than 100 µm so as to be readily filled into pores in a current-collecting body.

Preferable carbon materials further include thermally decomposed products of condensed polycyclic hydrocarbon compounds, such as char, pitch, cokes, and the like because their use provides a high-capacity secondary battery.

In the negative electrode of the non-aqueous secondary battery of the present invention, a foam metal or a fibrous sintered metal which contains nickel as a principal component thereof and which serves as a current-collecting body is filled with a carbon material which contains a binder, preferably a fluorine-containing resin binder. In other words, the current-collecting body is integrated with the negative electrode material such that it spreads three-dimensionally within the negative electrode material. Accordingly, the average distance between the negative electrode material and the current-collecting body is relatively small, resulting in a small internal resistance of the negative electrode. Thus, the greater part of the negative electrode material functions as expected, thereby providing a battery which has a large capacity and endures a large current.

The negative electrode is preferably formed, for example, through the steps of mixing a solvent with a mixture of a fluorine-containing resin serving as a binder and a carbon material to thereby prepare slurry; applying the resulting slurry onto a sheet-shaped foam metal or a mat-shaped fibrous sintered metal; and drying the coated sheet or mat. Preferably, the coated sheet or mat is subsequently pressed so as to adjust porosity. Alternatively, the negative electrode may be formed through the steps of dissolving a fluorine-containing resin and a cross-linking agent in an organic solvent such as toluene or xylene; mixing the resulting solution with powder of a carbon material to thereby prepare slurry; applying the resulting slurry onto the foam metal sheet or the fibrous sintered metal mat; drying the coated sheet or mat at a temperature of 50° to 100° C. to thereby remove the solvent; and pressing the coated sheet or mat while heating it to a temperature of 100° to 180° C. to thereby harden it.

In the negative electrode, the foam metal or fibrous sintered metal and a binder, such as a fluorine-containing resin, bind the negative electrode material. Accordingly, even when the carbonaceous material repeatedly expands and contracts due to charge-discharge cycles, particles of the carbonaceous material maintain their mutual contact, thereby suppressing an increase in the internal resistance of the negative electrode and preventing particles of the carbonaceous material from dropping out of the negative electrode during charge/discharge; thereby maintaining the initial capacity of the battery.

The negative electrode allows porosity thereof to be adjusted by compression through use of a press or the like operating at a pressure of 100 to 1000 kg/cm$^2$, so that the capacity per unit volume of the negative electrode can be increased. Also, the formation of an adequate amount of pores within the negative electrode allows the negative electrode to be readily impregnated with an electrolyte, thereby securing passages necessary for diffusion of lithium ions and thus providing a high utilization rate of the negative electrode material even when a large current is loaded.

As described above, the thickness and porosity of the negative electrode are adjusted by compression with a press or the like, of the foam metal or fibrous sintered metal, which is filled with a binder-containing carbon material. The thickness of the negative electrode is not less than 0.1 mm, preferably not less than 0.2 mm. When the thickness is less than 0.1 mm, the amount of the carried negative electrode material decreases, resulting in a decreased battery capacity. When the thickness is too large, the porosity is difficult to adjust through compression, resulting in an impaired practical application. Thus, the thickness is preferably not more than 10 mm. When the material undergoes pressing while it is heated at a temperature above the melting point of a binder, the strength of the negative electrode increases, resulting in significantly improved battery characteristics. Meanwhile, when the porosity is too low, impregnation with an electrolyte is difficult to perform, causing degraded conductivity of ions via the electrolyte. Consequently, the activity of the negative electrode material is limited, resulting in a reduced battery capacity. Therefore, the porosity is preferably 20 to 50%, more preferably 25 to 40%. The porosity is represented as [(a volume occupied by pores)÷(an apparent volume)]×100. The volume occupied by pores is measured by the mercury intrusion porosimetry.

The foam metal, which contains nickel as a principal component thereof, is preferably a spongy porous body having continuous pores. In order to markedly produce the effects of the present invention; i.e. a small internal resistance, and less reduction in a battery capacity and prevention of increase in an internal resistance even after charge-discharge cycles are repeated, each pore of the foam metal used in the negative electrode and containing nickel as a principal component thereof has an opening diameter of 10 µm to 1.0 mm. When the opening diameter is less than 10 µm, it becomes difficult to fill pores with a mixture of a carbon material and a binder. On the other hand, when the opening diameter exceeds 1.0 mm, there is an increase in the average distance between a lithium-stored carbonaceous material serving as the negative electrode material and the foam metal that serves as a current-collecting body, thereby resulting in an increased internal resistance of the electrode.

The foam metal containing nickel as a principal component thereof preferably has a porosity of 70 to 98%. When the porosity is less than 70%, pores can contain a smaller amount of a mixture of a carbon material and a binder, resulting in a reduced battery capacity. On the other hand, when the porosity exceeds 98%, the strength of the foam metal is reduced, resulting in a reduced force of binding the negative electrode material.

For the same reasons cited in the case of the cell diameter of the foam metal, the fibrous sintered metal containing nickel as a principal component thereof preferably has a fiber diameter of 1 to 50 µm. The fibrous sintered metal is either short-fibered or long-fibered. The porosity of the fibrous sintered metal is preferably 50 to 95% for the same reasons cited in the case of the foam metal.

The foam metal and the fibrous sintered metal used in the negative electrode of the present invention may be made of any material that contains nickel as a principal component thereof and that is resistant to corrosion by lithium. Examples of such material include nickel-copper alloy and nickel-iron-chrome alloy. Nickel foam metals and fibrous sintered metals are readily available on the market. An example of the former is CELMET from Sumitomo Electric Industries., Ltd. and an example of the latter is CNP-Ni-MAT from Nippon Seisen Co., Ltd.

The electrolyte used in the present invention is a non-aqueous electrolyte that shows a relatively high decomposition voltage. A binder used in the negative and positive electrodes is preferably a fluorine-containing resin that is insoluble in a solvent of the electrolyte and is stable under those conditions under which a non-aqueous secondary battery functions electrochemically. A fluorine-containing resin has excellent resistance to heat and chemicals. Thus, a fluorine-containing resin used as a binder stably and effectively maintains the contact between particles of an electrode material and prevents particles of the electrode material from dropping out of an electrode. A fluorine-containing resin for use as a binder is preferably polytetrafluoroethylene (PTFE), polyvinylidene fluoride (PVDF), or a like resin that disperses or dissolves in an organic solvent. In this case, preferably, a binder is dispersed or dissolved in an organic solvent, the resulting solution is mixed with an electrode material to thereby prepare slurry, and the resulting slurry is caused to be carried in a current-collecting body. Also, a fluorine-containing resin that is used in combination with a hardener (a cross-linking agent or the like) may be preferably used.

In the coin-shaped secondary battery of the present invention, the cover (lid) of a container serves preferably also as the terminal of a negative electrode. The negative electrode and the inner surface of the cover are electrically connected, preferably by a nickel mesh being in a compressed state.

When the cover (lid) of the container serves also as the terminal of the negative electrode, the negative electrode and the inner surface of the cover are preferably electrically connected by welding. Welding provides an electrical connection having a lower resistance and increases a force for binding the electrode material. Welding is preferably electric welding in which a current is caused to flow within a short period of time. More preferably, welding is combined with use of a nickel mesh being in a compressed state.

Preferably, in the non-aqueous secondary battery of the present invention, the positive electrode is a foam metal or a fibrous sintered metal that contains aluminum, titanium, SUS316, or SUS316L as a principal component thereof and which is filled with a mixture of an electrically conductive material and a positive electrode material capable of occluding and releasing lithium, together with a binder. The positive electrode preferably has a thickness of not less than 0.1 mm and a porosity of 20 to 50%.

In the above-described positive electrode, as in the case of the aforementioned negative electrode, a current-collecting body is integrated with the positive electrode material such that it spreads three-dimensionally within the positive electrode material. Accordingly, the average distance between the positive electrode material and the current-collecting body is relatively small, resulting in a small internal resistance of the positive electrode. As a result, the entire positive material functions as expected, thereby providing a battery having a large capacity.

Examples of the positive electrode material capable of occluding and releasing lithium include chalcogenides, such as oxides, compound oxides, and sulfides, that contain a metal or metals belonging to 4, 5, 6, 7, 8, 9, 10, 11, 12, 13 and 14 groups of the periodic table as a principal component thereof, and oxyhalogenides that also contain the same metal or metals as a principal component thereof. Also included are electrically conductive polymeric materials such as polyaniline, polypyrrole, polythiophene, polyacene, polyparaphenylene, or their derivatives.

Among these positive electrode materials, a spinel type lithium-manganese compound oxide, which is represented by the chemical formula of $LiCoO_2$, $LiNiO_2$, $LiMnO_2$, or $LiMn_2O_4$, is a preferred positive electrode material because of its relatively high working electric potential and relatively large capacity of occluding and releasing lithium. Particularly, $LiMn_2O_4$ is a more preferred positive electrode material because it is abundant in terms of natural resources and can be industrially produced at low cost.

Among spinel type lithium-manganese compound oxides described above, $LiMn_{2-x}Fe_xO_4$ (X is not more than 0.4), $LiMn_{2-y}Zn_yO_4$ (Y is not more than 0.4), and $LiMn_{2-x-y}Fe_xZn_yO_4$ (X ranges from 0.2 to 0.4 and Y ranges from 0.04 to 0.15) are preferred.

The grain size of powder of the positive electrode material is preferably 1 to 80 μm for easy filling of the powder into pores in the current-collecting body, for smooth occlusion and release of lithium, and for reduced tendency to bulk.

Preferably, in the secondary battery of the present invention, a mixture of the above-described positive electrode material and an electrically conductive material, together with a binder, is filled into pores in the current-collecting body. Such use of the positive electrode material is possible because the material is in the form of powder. As a result, the internal resistance of the positive electrode can be decreased, and swelling of the positive electrode as well as dropout of the positive electrode material due to charge-discharge cycles can be prevented.

Preferably, natural graphite, carbon black, or highly graphitized artificial graphite, each of which has good electric conductivity, is used as the electrically conductive material.

A mixture comprising an electrically conductive material, a binder, and a positive electrode material is carried in a foam metal or fibrous sintered metal that serves as a current-collecting body. Preferably, material for the current-collecting body of the positive electrode is stable within the range of electric potentials at which the positive electrode operates, is free from dissolution or elution, and has excellent electric conductivity. A foam metal or fibrous sintered metal that contains as a principal component thereof aluminum, titanium, SUS316, or SUS316L meets these requirements. These metals are industrially produced. An example of such an aluminum-based foam metal is "Duocel Al Foam" produced by Energy Research and Generation Inc. An example of such a SUS316-based sintered metal is "Naslon Web Sintered" produced by Nippon Seisen Co., Ltd.

The foam metal is preferably a spongy porous metal having mutually communicating pores or continuous pores. The foam metal that is used as the current-collecting body of the positive electrode preferably has a cell diameter of the pores of 10 μm to 1.0 mm for the same reasons cited in the case of the negative electrode.

The foam metal preferably has a porosity of 70 to 98% for the same reason cited in the case of the negative electrode.

The aluminum-, titanium-, SUS316-, or SUS316L-based fibrous sintered metal used in the positive electrode preferably has a fiber diameter of 1 to 50 µm and a porosity of 50 to 95%, for the same reasons cited in the case of the current-collecting body of the negative electrode. These fibrous sintered metals are preferably in the form of a short-fiber sintered, a long-fiber aggregate, or a long-fiber sintered.

The positive electrode is produced, for example, by the steps of preparing slurry by adding an organic solvent to a mixture comprising powder of a positive electrode material, an electrically conductive material, and a fluorine-containing resin serving as a binder; applying the resulting slurry onto a foam metal sheet or a fibrous sintered metal mat; drying the coated sheet or mat to thereby remove the organic solvent; and compressing by a press or the like the coated sheet or mat preferably at a pressure of 100 to 1000 kg/cm$^2$ to thereby adjust the thickness and porosity of the positive electrode.

The slurry may be prepared through the steps of dissolving in a solvent a fluorine-containing resin serving as a binder, as well as a hardener (a cross-linking agent); and adding to the resulting solution a powder of a positive electrode material, as well as a powder of an electrically conductive material. When a binder is employed in combination with its hardener, removal of the organic solvent and bridging of the polymer of the resin proceed concurrently while the slurry-coated foam metal or fibrous sintered metal is being dried and heated.

A fluorine-containing resin which is used as a binder for the negative electrode either singly or in combination with a cross-linking agent can preferably be used as a binder for the positive electrode.

In the positive electrode, the foam metal or fibrous sintered metal and the binder bind the positive electrode material. Accordingly, even when the positive electrode material repeatedly expands and contracts due to charge-discharge cycles, particles of the positive electrode material maintain their mutual contact, thereby suppressing an increase in the internal resistance of the positive electrode and preventing particles of the positive electrode material from dropping out of the positive electrode; thereby maintaining the initial capacity of the battery for a long period of time.

The positive electrode can be compressed by a press or the like to thereby decrease the porosity thereof, so that the capacity per unit volume of the positive electrode can be increased. Also, formation of an adequate amount of pores within the positive electrode allows the positive electrode to be readily impregnated with an electrolyte, thereby securing passages necessary for diffusion of lithium ions and thus providing a high utilization rate of the positive electrode material even when a large current is caused to flow therethrough.

The thickness of the positive electrode is not less than 0.1 mm, preferably not less than 0.2 mm, and is preferably not more than 10 mm, and the porosity of the positive electrode is 20 to 50%, preferably 25 to 40%, for the same reasons cited in the case of the negative electrode. As in the case of the negative electrode, when the positive electrode undergoes pressing while being heated to a temperature above the melting point of a binder, the strength of the positive electrode increases, resulting in significantly improved battery characteristics.

In the coin-shaped non-aqueous secondary battery of the present invention, the metallic case of the container serves preferably also as the terminal of the positive electrode. The positive electrode and the inner surface of the case are electrically connected via a mesh made of aluminum, titanium, SUS316, or SUS316L and which is in a compressed state. This decreases the contact resistance between the positive electrode and the case that also serves as the terminal of the positive electrode.

When the case of the container preferably serves also as the terminal of the positive electrode, the positive electrode and the inner surface of the case are preferably electrically connected by welding. Welding provides an electrical connection having a lower resistance and increases a binding force for an electrode material. Welding is preferably electric welding in which a current is caused to flow within a short period of time. More preferably, welding is combined with use of the above-described metallic mesh that is in a compressed state.

In another preferred coin-shaped battery, a metallic ring is disposed around a disk-shaped positive electrode such that it is in contact with the positive electrode. A metallic mesh is embedded in the top and/or bottom surface of the positive electrode such that it is electrically connected to the metallic ring.

As compared with the case where a planar current-collecting body such as metallic foil is disposed on one side of a positive electrode, the above-described metallic mesh embedded in the top and/or bottom surface of the positive electrode provides better contact with the positive electrode. Also, the metallic meshes embedded in both top and bottom surfaces decrease an electric resistance in a direction of the thickness of the positive electrode; i.e. the internal resistance of the positive electrode, so that a diffusion distance of lithium ions decreases. As a result, the utilization rate of the positive electrode material increases, and the energy density and capacity of the battery increase accordingly.

Since the metallic ring is disposed around as well as in contact with the positive electrode, and the above-described metallic mesh embedded in the positive electrode is in contact with the metallic ring, the metallic ring can efficiently collect current that flows through the metallic mesh in parallel with the top and bottom surfaces of the positive electrode.

In the positive electrode, the metallic ring also functions to bind the positive electrode material. Accordingly, even when the positive electrode material repeatedly expands and contracts due to charge-discharge cycles, particles of the positive electrode material maintain their mutual contact, thereby suppressing an increase in the internal resistance of the positive electrode and preventing particles of the positive electrode material from dropping out of the positive electrode; thereby maintaining the initial capacity of the battery for a long period of time.

The metallic ring and the metallic mesh are preferably made of aluminum, titanium, SUS316, or SUS316L because these materials are stable within the range of electric potentials at which the positive electrode operates, are free from dissolution or elution, and have excellent electric conductivity.

Examples of a preferred organic solvent for a non-aqueous electrolyte of a battery of the present invention include cyclic carbonates such as propylene carbonate and ethylene carbonate; straight-chain carbonates such as dimethyl carbonate, diethyl carbonate, and ethyl methyl carbonate; γ-butyrolactone; 1,3-dioxolan; sulfolane; dioxolan; 1,3-dioxane; 1,2-dimethoxyethane; tetrahydrofuran; and 2-methyltetrahydrofuran.

One or more lithium salts selected from those whose anions include $ClO_4^-$, $CF_3SO_3^-$, $BF_4^-$, $PF_6^-$, $AsF_6^-$, $SbF_6^-$, $CF_3CO_2^-$, $B_{10}Cl_{10}^{2-}$, and $(CF_3SO_2)_2N^-$ can be preferably used as a lithium salt that serves as electrolyte for use in the battery of the present invention. A non-aqueous electrolyte is preferably obtained by dissolving the above-described lithium salt in the above-described organic solvent to a concentration of 0.2 to 2.0 moles/liter. If the concentration falls outside this range, ionic conductivity will likely degrade, and/or a lithium salt will likely precipitate.

BRIEF DESCRIPTION OF THE DRAWINGS

The above and further objects, features and advantages of the present invention will become more apparent from the following detailed description taken in conjunction with the accompanying drawings, wherein.

DESCRIPTION OF THE PREFERRED EMBODIMENTS

The present invention will now be described in detail with reference to embodiments of a coin-shaped battery. However, the present invention is not limited thereto, but is also applicable to a wound structure type battery (for example, U.S. Pat. No. 5,370,710) and a laminated structure type battery (for example, Japanese laid-open patent No. 4-294071).

Figure 1:
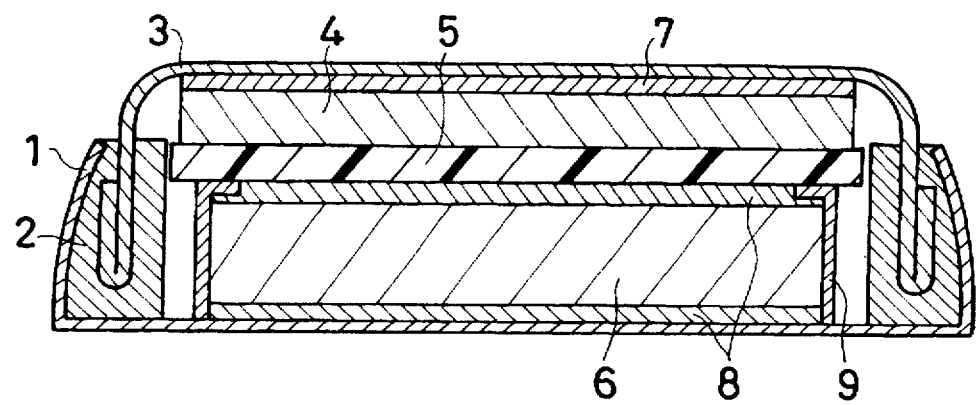
FIG. 1 is a sectional view of the structure of a battery used in Examples 1–5 of the present invention.
Figure 2:
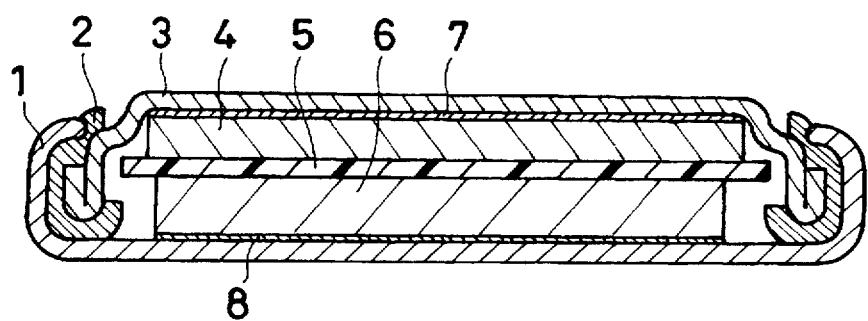
FIG. 2 is a sectional view of the structure of a battery used in Examples 6–12 of the present invention and Comparative Examples 1–3.

In FIG. 1 and FIG. 2, numeral 1 denotes a case of a coin-shaped container (cell), which case serves also as a positive electrode terminal, and numeral 3 denotes a lid of the coin-shaped container, which lid serves also as a negative electrode terminal. The case 1 and the lid 3 are crimped via a gasket 2 to thereby be sealed. The container accommodates a negative electrode 4, a separator 5, and a positive electrode 6. The negative electrode 4, the separator 5, and the positive electrode 6 are impregnated with a non-aqueous electrolyte. A mesh 8 that is in a compressed state in FIG. 2 on an expanded metal 8 in FIG. 1 is interposed between the case 1 and the positive electrode 6 to thereby establish an electrical connection therebetween. A mesh 7 that is in a compressed state in FIG. 2 on an expanded metal 7 in FIG. 1 is interposed between the lid 3 and the negative electrode 4 to thereby establish an electrical connection therebetween. A metallic ring 9 in FIG. 1 is fitted to the circumference of the sheet of the positive electrode 6.

EXAMPLE 1

The negative electrode 4 was manufactured as follows. Slurry that contained baked petroleum coke (a thermally decomposed product of a condensed polycyclic hydrocarbon compound, average grain size=approx. 15 μm, $D_{002}$=0.344 nm, Lc=5 nm, 47 parts by weight), polyvinylidene fluoride (PVDF, 3 parts by weight), and N-methyl-2-pyrrolidone (50 parts by weight) was applied onto a sheet (thickness=1.4 mm) of foam metal (porosity=96%, average cell diameter= 0.4 mm) of nickel. The coated sheet was heated at a temperature of 180° C. to thereby dry it. A circular piece having a diameter of 19 mm was blanked out from the dried sheet, and was compressed to a thickness of 0.8 mm by a press. In order to completely remove water from the thus-manufactured negative electrode, it was dried at a temperature of 180° C. under a reduced pressure of 0.1 torr for 4 hours. The porosity of the thus-obtained negative electrode was 36%.

The positive electrode 6 was manufactured as follows. A mixture containing $LiMn_2O_4$ (80 parts by weight), natural graphite (15 parts by weight), and polytetrafluoroethylene (PTFE, 5 parts by weight) was formed into a sheet having a thickness of 1.7 mm. A disk having a diameter of 18 mm was blanked out from the sheet, and a metallic ring 9 made of SUS316L is fitted to the circumference of the disk. An expanded metal 8 (hereinafter referred to as EXM) of aluminum having a thickness of 0.05 mm and a diameter of 8 mm was placed onto both faces of the disk. The assembly was compressed to a thickness of 1.5 mm by a press, simultaneously establishing the electrical connection between the aluminum EXM and the metallic ring. The disk assembly was dried at a temperature of 180° C. under a reduced pressure of 0.1 torr for 4 hours to thereby completely remove water therefrom. The porosity of the thus-obtained positive electrode was 33%. The porosity was measured by Autoscan-500 Durosimeter from Quanta Chrome Corp. Measurement of porosity was performed in the same manner in the following embodiments and comparative examples.

A separator including nonwoven fabric made of polypropylene and micro-porous film made of polypropylene was used. An electrolyte was prepared as follows. Ethylene carbonate and ethyl methyl carbonate were mixed at a volume ratio of 1:1 so as to obtain a solvent mixture. $LiPF_6$ was then dissolved in the solvent mixture so as to achieve a concentration of 1 mol/liter.

Subsequently, the positive electrode 6, together with the aluminum EXM 8, was connected to the inner surface of the case 1 by electric welding. The negative electrode 4 and the lid 3 were disposed such that the negative electrode 4 contacts the inner surface of the lid 3 to thereby establish the electrical connection therebetween. The positive electrode 6 and the negative electrode 4 were placed in the coin-shaped container having a diameter of 24.5 mm and a thickness of 3.0 mm while the separator 5 was interposed between the positive electrode 6 and the negative electrode 4. Then, the positive electrode 6, the negative electrode 4, and the separator 5 within the container were impregnated with the above-described electrolyte. Impregnation of the electrodes and the like with the electrolyte and sealing of the container were conducted within a glove box of an argon atmosphere having a dew point of minus 70° C. Thus, the coin-shaped secondary battery as shown in FIG. 1 was manufactured.

EXAMPLE 2

The present embodiment is similar to the Example 1 except that the negative electrode 4 (thickness=0.8 mm, porosity=36%) was manufactured through use of fibrous sintered metal (porosity=91%, fiber diameter=20 μm) of nickel which had a thickness of 1.4 mm before pressing as the current-collecting body for the negative electrode 4.

EXAMPLE 3

In the Example 1, the negative electrode 4 and the lid 3 were disposed so as to contact each other in order to establish an electrical connection therebetween. By contrast, in the present example, the foam metal of nickel serving as the negative electrode 4 was connected to the inner surface of the lid 3 by electric welding. Other features were similar to those of the Example 1.

EXAMPLE 3

In the Example 2, the negative electrode 4 and the lid 3 were disposed so as to contact each other in order to establish an electrical connection therebetween. By contrast, in the present example, the fibrous metal of nickel serving as the negative electrode 4 was connected to the inner surface of the lid 3 by electric welding. Other features were similar to those of the Example 2.

EXAMPLE 5

The negative electrode 4 was manufactured as follows. Slurry containing baked petroleum coke (a thermally decomposed product of a condensed polycyclic hydrocarbon compound, average grain size=approx. 15 μm, $d_{002}$=0.344 nm, Lc=5 nm, 47 parts by weight), PVDF (3 parts by weight), and N-methyl-2-pyrrolidone (50 parts by weight) was applied onto a sheet (thickness=1.4 mm) of foam metal (porosity=96%, cell diameter=0.4 mm) of nickel. The coated sheet was heated at a temperature of 180° C. to thereby dry it, and a circular piece having a diameter of 19 mm was blanked out from the dried sheet. A nickel EXM (thickness=0.08 mm, diameter=19 mm) was placed on one face of the circular piece, and this assembly was compressed to a thickness of 0.8 mm by a press. In order to completely remove water from the thus-manufactured negative electrode, it was dried at a temperature of 180° C., under a reduced pressure of 0.1 torr for 4 hours. The porosity of the thus-obtained negative electrode was 36%.

The positive electrode 6 was manufactured in a manner similar to that of the Example 1. A separator and electrolyte used were the same as those of the Example 1.

The positive electrode 6, together with the aluminum EXM, was connected to the inner surface of the case 1 by electric welding. Also, the negative electrode 4, together with the nickel EXM, was welded to the inner surface of the lid 3. The positive electrode 6 and the negative electrode 4 were placed in the coin-shaped container while the separator 5 was interposed between the positive electrode 6 and the negative electrode 4. Then, the positive electrode 6, the negative electrode 4, and the separator 5 within the container were impregnated with the above-described electrolyte. Impregnation of the electrode with the electrolyte and sealing of the container were conducted within a glove box of an argon atmosphere having a dew point of minus 70° C. Thus, the coin-shaped secondary battery as shown in FIG. 1 was manufactured.

EXAMPLE 6

The negative electrode 4 was manufactured in a manner similar to that of the Example 5.

The positive electrode 6 was manufactured as follows. A sheet (thickness=3.0 mm) of foam metal made of aluminum (porosity=93%, average cell diameter=0.4 mm) was filled with slurry which was obtained by mixing $LiMn_2O_4$ (42 parts by weight), natural graphite (5 parts by weight), PVDF (3 parts by weight), and N-methyl-2-pyrrolidone (50 parts by weight). The sheet was heated at a temperature of 180° C. to thereby dry it. A disk having a diameter of 18 mm was blanked out from the dried sheet, and was pressed to a thickness of 1.5 mm. In order to completely remove water from the thus-manufactured positive electrode, it was dried at a temperature of 180° C. under a reduced pressure of 0.1 torr for 4 hours. The porosity of the thus-obtained positive electrode was 35%.

A separator and electrolyte used were the same as those of the Example 1.

The foam metal of aluminum serving as the positive electrode 6 was connected to the inner surface of the case 1 by electric welding. Also, the negative electrode 4, together with the nickel EXM, was welded to the inner surface of the lid 3. The positive electrode 6 and the negative electrode 4 were placed in the coin-shaped container while the separator 5 was interposed between the positive electrode 6 and the negative electrode 4. Then, the positive electrode 6, the negative electrode 4, and the separator 5 within the container were impregnated with the above-described electrolyte. Impregnation of the electrode with the electrolyte and sealing of the container were conducted within a glove box of an argon atmosphere having a dew point of minus 70° C. Thus, the coin-shaped secondary battery as shown in FIG. 2 was manufactured.

EXAMPLE 7

A battery was manufactured in the same manner as in the Example 6 except the following. The positive electrode 6 having a porosity of 36% was manufactured using fibrous sintered metal (porosity=91%, fiber diameter=15 μm, thickness=3.0 mm) of SUS316L. The fibrous sintered metal of SUS316L serving as the positive electrode 6 was connected to the inner surface of the case 1 by electric welding.

EXAMPLE 8

The negative electrode 4 was manufactured in a manner similar to that of the Example 5.

The positive electrode 6 was manufactured as follows. A sheet (thickness=3.0 mm) of foam metal made of aluminum (porosity=93%, average cell diameter=0.4 mm) was filled with slurry which was obtained by mixing $LiMn_2O_4$ (42 parts by weight), natural graphite (5 parts by weight), PVDF (3 parts by weight), and N-methyl-2-pyrrolidone (50 parts by weight). The sheet was heated at a temperature of 180° C. to thereby dry it. A disk having a diameter of 18 mm was blanked out from the dried mat. An aluminum EXM (thickness=0.05 mm, diameter=18 mm) was disposed on one face of the disk. This assembly was pressed to a thickness of 1.5 mm. In order to remove water from the thus-manufactured positive electrode, it was dried at a temperature of 180° C. under a reduced pressure of 0.1 torr for 4 hours. The porosity of the thus-obtained positive electrode was 35%.

A separator and electrolyte used were the same as those of the Example 1.

The positive electrode 6, together with the aluminum EXM, was connected to the inner surface of the case 1 by electric welding. Also, the negative electrode 4, together with the nickel EXM, was connected to the inner surface of the lid 3 by electric welding. The positive electrode 6 and the negative electrode 4 were placed in the coin-shaped container while the separator 5 was interposed between the positive electrode 6 and the negative electrode 4. Then, the positive electrode 6, the negative electrode 4, and the separator 5 within the container were impregnated with the above-described electrolyte. Impregnation of the electrode with the electrolyte and sealing of the container were conducted within a glove box of an argon atmosphere having a dew point of minus 70° C. A battery was thus manufactured.

EXAMPLE 9

A battery was manufactured in the same manner as in the Example 8 except the following. The positive electrode 6 having a porosity of 36% was manufactured using fibrous sintered metal (porosity=91%, fiber diameter=15 μm, thickness=3.0 mm) of SUS316L as well as SUS316L EXM (thickness=0.05 mm, diameter=18 mm). The positive electrode 6, together with the SUS316L EXM, was connected to the inner surface of the case 1 by electric welding.

EXAMPLE 10

A battery was manufactured in the same manner as in the Example 9 except the following. A negative electrode having a porosity of 37% was manufactured using a powder of graphitized mesophase spherical carbon (average grain size=approx. 20 μm, $d_{002}$=0.3365 nm, Lc=30 nm, 47 parts by weight) in place of a thermally decomposed product of a condensed polycyclic hydrocarbon compound used in the Example 9.

EXAMPLE 11

A battery was manufactured in the same manner as in the Example 10 except the following. A negative electrode having a porosity of 39% was manufactured using a fibrous powder of graphitized mesophase carbon (average fiber diameter=8.3 μm, fiber length=60 μm, $d_{002}$=0.337 nm, Lc=64 nm, 47 parts by weight) in place of the powder of graphitized mesophase spherical carbon used in the Example 10.

EXAMPLE 12

A battery was manufactured in the same manner as in the Example 11 except the following. A positive electrode was manufactured using $LiZn_{0.05}Fe_{0.35}Mn_{1.6}O_4$ (42 parts by weight) in place of $LiMn_2O_4$.

COMPARATIVE EXAMPLE 1

The negative electrode 4 was manufactured as follows. A mixture containing baked petroleum coke (a thermally decomposed product of a condensed polycyclic hydrocarbon compound, average grain size=approx. 15 μm, $d_{002}$=0.344 nm, Lc=5 nm, 95 parts by weight) and PTFE (5 parts by weight) was rolled to obtain a sheet having a thickness of 1.0 mm. A disk having a diameter of 19 mm was blanked out from the sheet. A nickel EXM (thickness=0.08 mm, diameter=19 mm) was disposed on one face of the disk, and this assembly was pressed to a thickness of 0.8 mm. In order to remove water from the thus-manufactured negative electrode, it was dried at a temperature of 180° C. under a reduced pressure of 0.1 torr for 4 hours. The porosity of the thus-obtained negative electrode was 31%.

The positive electrode 6 was manufactured as follows. A mixture containing $LiMn_2O_4$ (80 parts by weight), natural graphite (15 parts by weight), and PTFE (5 parts by weight) was rolled to obtain a sheet having a thickness of 1.7 mm. A disk having a diameter of 18 mm was blanked out from the sheet. An aluminum EXM (thickness=0.05 mm, diameter=18 mm) was disposed on one face of the disk, and this assembly was pressed to a thickness of 1.5 mm. In order to remove water from the thus-manufactured positive electrode, it was dried at a temperature of 180° C. under a reduced pressure of 0.1 torr for 4 hours. The porosity of the thus-obtained positive electrode was 33%.

A separator comprising nonwoven fabric made of polypropylene and micro-porous film made of polypropylene was used. A non-aqueous electrolyte was prepared as follows. Ethylene carbonate and ethyl methyl carbonate were mixed at a volume ratio of 1:1 to obtain a solution. $LiClO_4$ was dissolved in the solution to a concentration of 1 mol/liter. The positive electrode and the negative electrode were disposed such that the aluminum EXM surface of the positive electrode faces the inner surface of a case and such that the nickel EXM surface of the negative electrode faces the inner surface of a lid, to thereby establish an electrical contact therebetween. Impregnation of the electrode with the electrolyte and sealing of the case were conducted within a glove box of an argon atmosphere having a dew point of minus 70° C. Thus, the coin-shaped secondary battery as shown in FIG. 2 was manufactured.

COMPARATIVE EXAMPLE 2

A battery was manufactured in the same manner as in the Comparative Example 1 except the following. A negative electrode was manufactured using a powder of graphitized mesophase spherical carbon (average grain size=approx. 20 μm, $d_{002}$=0.3365 nm, Lc=30 nm, 95 parts by weight) in place of a thermally decomposed product of a condensed polycyclic hydrocarbon compound used in the Comparative Example 1.

COMPARATIVE EXAMPLE 3

A battery was manufactured in the same manner as in the Comparative Example 2 except the following. A negative electrode was manufactured using a fibrous powder of graphitized mesophase carbon (average fiber diameter=8.3 μm, fiber length=60 μm, $d_{002}$=0.337 nm, Lc=64 nm, 95 parts by weight) in place of the powder of graphitized mesophase spherical carbon used in the Comparative Example 2.

In order to evaluate discharging characteristics of batteries of the Examples 1–12 and the Comparative Examples 1–3, the batteries were charged at a maximum current of 1 mA for 100 hours until the battery voltage increased to 4.2 V, and subsequently discharged at a constant current of 0.5 mA until the battery voltage decreased to 2.5 V. The capacity of the batteries was then measured. Next, in order to evaluate large-current discharging characteristics of the batteries, the batteries were charged at a maximum current of 1 mA for 100 hours until the battery voltage increased to 4.2 V, and subsequently discharged at a constant current of 5 mA until the battery voltage decreased to 2.5 V. The capacity of the batteries was then measured. Also, in order to evaluate charge-discharge cycle characteristics of the batteries, a charge-discharge cycle (50-hour charging at a maximum current of 2 mA until the battery voltage increases to 4.2 V and discharging at a constant current of 1 mA until the battery voltage decreases to 3.0 V) was repeated 20 times, and subsequently was measured the ratio of the battery capacity after completion of the 20th cycle to the initial discharge capacity. The results are summarized in the following table.

| | Discharge characteristics | | |
|---|---|---|---|
| | Capacity at 0.5 mA (mAh) | Capacity at 5 mA (mAh) | Capacity ratio after 20 cycles at 1 mA (%) |
| Example 1 | 53.0 | 27.3 | 67 |
| Example 2 | 52.0 | 25.4 | 65 |
| Example 3 | 53.6 | 30.5 | 75 |
| Example 4 | 52.7 | 29.0 | 71 |
| Example 5 | 54.0 | 32.5 | 74 |
| Example 6 | 53.8 | 41.0 | 86 |
| Example 7 | 53.5 | 39.4 | 80 |
| Example 8 | 54.0 | 42.8 | 80 |
| Example 9 | 53.6 | 40.6 | 78 |

-continued

| | Discharge characteristics | | |
|---|---|---|---|
| | Capacity at 0.5 mA (mAh) | Capacity at 5 mA (mAh) | Capacity ratio after 20 cycles at 1 mA (%) |
| Example 10 | 55.3 | 43.5 | 82 |
| Example 11 | 56.5 | 43.5 | 88 |
| Example 12 | 55.0 | 42.1 | 95 |
| Comparative Example 1 | 49.5 | 5.0 | 35 |
| Comparative Example 2 | 50.2 | 8.0 | 40 |
| Comparative Example 3 | 51.0 | 13.0 | 44 |

As is apparent from the results of the tests on the examples and comparative examples, the coin-shaped non-aqueous secondary battery to which the present invention is applied has improved discharge characteristics for large current, provides a high energy density, and has an excellent durability against repeated charge/discharge cycles.

What is claimed is:

1. A non-aqueous electrolyte secondary battery comprising:
   a negative electrode comprising negative electrode material particles capable of occluding and releasing lithium;
   a positive electrode comprising positive electrode material particles capable of occluding and releasing lithium;
   a non-aqueous electrolyte which contains a lithium salt; and
   a container for accommodating said negative electrode, said positive electrode, and said electrolyte;
   said negative electrode being formed by compressing a foam metal or a fibrous sintered metal structure which contains nickel as a principal component of the metal and which serves as a current collecting body and which is filled with a mixture of a dried slurry of a binder and particles of a carbon material, functioning as the negative electrode material, which is a mesophase spherical carbon or a mesophase carbon short fiber, the carbon material being capable of occluding and releasing lithium, the current collecting body being integrated with the negative electrode material such that it spreads three dimensionally within the negative electrode material to maintain mutual contact of the negative electrode material particles and said negative electrode having a thickness of not less than 0.1 mm and a porosity of 20 to 50%.

2. A battery as recited in claim 1, wherein a lid of said container serves also as a terminal of said negative electrode, and said negative electrode and the inner surface of said cover are electrically connected through a nickel mesh after compression of the nickel mesh and while it is in a resulting compressed state.

3. A battery as recited in claim 1, wherein a lid of said container serves also as a terminal of said negative electrode, and said negative electrode and the inner surface of said cover are electrically connected by welding.

4. A battery as recited in claim 1, wherein said positive electrode is a foam metal or a fibrous sintered metal filled with a mixture of an electrically conductive material and a positive electrode material capable of occluding and releasing lithium, together with a binder, and said positive electrode has a thickness of not less than 0.1 mm and a porosity of 20 to 50%.

5. A battery as recited in claim 4, wherein said foam metal or fibrous sintered metal is made of a metal selected from the group consisting of aluminum, titanium, SUS316, and SUS316L.

6. A battery as recited in claim 1, wherein said positive electrode is provided with a metallic ring which is made of a metal selected from the group consisting of aluminum, titanium, SUS316, and SUS316L and is disposed around said positive electrode, and a metallic mesh which is made of a metal selected from the group consisting of aluminum, titanium, SUS316, and SUS316L and is embedded in the top and/or bottom surface of said positive electrode such that it is electrically connected to said metallic ring; and said positive electrode has a thickness of not less than 0.1 mm and a porosity of 20 to 50%.

7. A battery as recited in claim 4, wherein a case of said container serves also as a terminal of said positive electrode, and said positive electrode and the inner surface of said case are electrically connected through a metal mesh which is made of a metal selected from the group consisting of aluminum, titanium, SUS 316, and SUS 316L after compression of the metal mesh and while it is in a resulting compressed state.

8. A battery as recited in claim 4, wherein a case of said container serves also as a terminal of said positive electrode, and said positive electrode and the inner surface of said case are electrically connected by welding.

9. A battery as recited in claim 1, wherein said positive electrode material is $LiMn_2O_4$ or $LiMn_{2-x}Fe_xZn_yO_4$, wherein X ranges from 0.2 to 0.4, and Y ranges from 0.04 to 0.15.

* * * * *